United States Patent [19]

Finberg

[11] 4,076,655

[45] Feb. 28, 1978

[54] PHOTODEGRADABLE ATACTIC POLYSTYRENE COMPOSITIONS

[75] Inventor: Arne O. Finberg, Edison, N.J.

[73] Assignee: Mobil Oil Corporation, New York, N.Y.

[21] Appl. No.: 672,083

[22] Filed: Mar. 31, 1976

Related U.S. Application Data

[63] Continuation-in-part of Ser. No. 436,322, Jan. 24, 1974, now abandoned.

[51] Int. Cl.$^2$ .................................................. C08K 5/07
[52] U.S. Cl. ...................... 260/2.5 HB; 260/DIG. 43; 526/1; 526/4; 526/5
[58] Field of Search ................................. 526/1, 4, 5; 260/DIG. 43, 2.5 HB

[56] References Cited

U.S. PATENT DOCUMENTS

| 3,830,764 | 8/1974 | Hudgin et al. | 260/DIG. 43 |
| 3,888,804 | 6/1975 | Swanholm et al. | 260/DIG. 43 |
| 3,941,759 | 3/1976 | Taylor et al. | 260/DIG. 43 |

*Primary Examiner*—Eugene C. Rzucidlo
*Attorney, Agent, or Firm*—Charles A. Huggett

[57] ABSTRACT

Polystyrene compositions, including polystyrene film and foamed polystyrene, containing as a photodegradability enhancing agent an organic carbonyl-containing compound, preferably benzoin; and such compositions containing in addition to said agent, a pro-oxidant metal salt or an acetylacetonate thereby imparting markedly enhanced photodegradability characteristics to said compositions.

7 Claims, No Drawings

PHOTODEGRADABLE ATACTIC POLYSTYRENE COMPOSITIONS

CROSS-REFERENCE TO RELATED APPLICATIONS

This is a continuation-in-part of U.S. Ser. No. 436,322 filed Jan. 24, 1974, now abandoned.

BACKGROUND OF THE INVENTION

1. Field of the Invention

In the use of polystyrene resins for making polystyrene film and foam polystyrene products, useful for making plastic wrappings, containers and the like, which are subsequently discarded, a litter problem may result even though such resins degrade slowly upon outdoor exposure (e.g., sunlight). Hence, it is desirable that such compositions be imparted with accelerated photodegradability characteristics to minimize or alleviate such problem.

The present invention relates to polystyrene-based compositions, e.g., general purpose polystyrene, that accomplish such a result by incorporation into said compositions a carbonyl-containing organic compound, as defined hereinafter, in a relatively small amount based on the weight of the accelerate and sufficient to accelerate photodegradability of the polystyrene. In a preferred embodiment, the invention relates to such compositions which additionally contain a relatively small amount of a prooxidant metal salt or an acetylacetonate of iron or cobalt thereby further enhancing photodegradability characteristics.

2. Description of the Prior Art

Polyolefin compositions (e.g., polyethylene, polypropylene, polybutene) and degradable films made therefrom containing, among other components, prooxidant metal salts of organic acids and metal acetylacetonates are disclosed in U.S. Pat. No. 3,454,510.

Compositions of benzophenone in blends with isotactic polystyrene, and results of studies thereon for crystallization kinetics are disclosed in an article (pages 885 and following) by Boon and Azcue in Journal of Polymer Science, Part A-2, Vol. 6 (1968).

SUMMARY OF THE INVENTION

The present invention relates to polystyrene-based compositions, inclusive of crystal polystyrene film and foam polystyrene of enhanced photodegradability characteristics by virtue of incorporating into such compositions a small amount, based on the weight of the polystyrene, of a carbonyl-containing organic compound such as benzoin or benzophenone and preferably benzoin that acts as a free radical in activated state; and, in a further preferred embodiment, such compositions that additionally contain a prooxidant metal salt of an organic acid or an acetylacetonate of iron cobalt thereby imparting to such compositions markedly enhanced photodegradability properties. By use of certain combinations of the carbonyl-containing compounds and metal salts of an organic acid or such acetylacetonates, photodegradability characteristics of the resulting polystyrene-based compositions are enhanced in synergistic manner.

The present invention is particularly applicable to enhancing photodegradability characteristics of atactic polystyrenes which, as is known to those skilled in the art, are polymers of styrene in which the configuration of the monomer units are more or less random as distinguished from the higher melting isotactic polystyrenes.

The carbonyl-containing organic compounds embodied for use herein include those of the following structure: phenyl

wherein A is phenyl

or phenyl

and R is H, alkyl ($C_1$-$C_8$) or aryl.

Regarding the prooxidant metal salts, useful in combination with the carbonyl-containing agent (e.g., benzoin), particularly suitable are such salts, liquid or solid, that are known paint driers and, for example, salts disclosed in the Encyclopedia of Polymer Science and Technology, Vol. 4, pages 125–130. In specific aspect, organic acid salts of metals of groups IA, IIA, VII and VIII of the Periodic Chart of the Elements are suitable and particularly those of iron, cobalt manganese and calcium in the form of stearates, naphthenates, resinates, and others. More specifically, prooxidant metal salts or metal acetylacetonates embodied for use in practice of this invention, in combination with the carbonyl-containing organic compound (e.g., benzoin), include ferric acetylacetonate, cobalt acetylacetonate, stearates of manganese and cobalt, naphthenates of cobalt, manganese and iron, resinates of cobalt, manganese and iron and combinations of such metal salts.

The polystyrene-based compositions of accelerated photodegradability as embodied herein may be produced by any of numerous method that result in a blend of the polystyrene component with the carbonyl-containing agent (e.g., benzoin) and the prooxidant metal salts or metal acetylacetonate. In an example, such compositions in the form of a film can be prepared from melt blending (e.g., using a Brabender Plastograph) a blend of polystyrene (e.g., pellets), the carbonyl-containing agent and, when used, the prooxidant metal salt or metal acetylacetonate. In preparation of such compositions in the form of foam polystyrene, such foam materials can be prepared by any of the polystyrene foam producing methods known to those skilled in the art and which, for practice of this invention, utilize blends of the polystyrene component with the carbonyl-containing agent (e.g., benzoin) and when used the prooxidant metal salt or metal acetylacetonate. These include foams produced from polystyrene beads or pellets containing a suitable blowing agent (e.g., pentane, isopentane, etc.) by standard extrusion techniques, and by direct extrusion methods wherein beads or pellets of the polystyrene are introduced into an extruder and as the polystyrene is formed into a molten mass within the confines of the extruder, a blowing agent (e.g., pentane, isopentane, etc.) is injected into the molten mass. The resulting mixture is extruded into desired form of polystyrene foam (e.g., tubes, sheets, etc.). A specific method for producing foam polystyrene useful in practice of this invention is disclosed in U.S. Pat. No. 3,444,283.

In practice of this invention, and based on the weight of the polystyrene component, the compositions embodied herein usually comprise the carbonyl-containing agent (e.g., benzoin, benzophenone) in from about 0.01 to about 5% and, when used in combination with such an agent, the prooxidant metal salt or metal acetylacetonate usually is used in an amount sufficient to provide a concentration of from about 0.0001 to about 5% of the metal component of said salt or metal acetylacetonate by weight of the composition.

DESCRIPTION OF SPECIFIC EMBODIMENTS

In a specific embodiment, an atactic polystyrene (RSV = 0.90) was blended on a Brabender Plastograph at 170° C. for five minutes under a nitrogen atmosphere and compression molded between flat plates into a film (7-8 mil thick) under the conditions of ASTM-D-638. The blends thus prepared comprised the polystyrene component and benzoin or benzil as set forth in the following tabulation. The films were exposed outdoors at Edison, N.J., for a period of thirty days and the results therefrom are set forth in the following tabulation:

| Example | Polystyrene Content of Film (Wt. %) | Benzoin Content (Wt. %) | Benzil (Wt. %) | Exposure Days | Reduced Solution Viscosity (RSV) | Brittleness |
|---|---|---|---|---|---|---|
| 1(control) | 100 | — | — | 0 | 0.90 | — |
| 2(control) | 100 | — | — | 30 | 0.76 | Brittle |
| 3 | 99 | 1 | — | 30 | 0.41 | Very Brittle |
| 4 | 99 | — | 1 | 30 | 0.66 | Brittle |

Comparison of Control Examples 1 and 2 illustrate that the film of polystyrene (e.g., without benzoin) underwent some degradation under the outdoor exposure of 30 days in view of reduction in RSV and development of brittleness. However, as shown for the values for Examples 3 and 4 containing benzoin or benzil, respectively, the RSV substantially decreased with development of substantially more brittleness. A reduction in RSV and increase in brittleness evidences degradation by breakdown of molecular weight and loss of physical properties.

The values shown for RSV in the foregoing tabulation, as well as for other RSV values set forth herein, were determined by the following procedure:

100 milligrams of the sample is dissolved in 100 ml. toluene and RSV is the value for the solution calculated from the following equation:

$$RSV = t - t_o/(t_o \times C)$$

where $t$ = flow time of the solution at 30° C. and $t_o$ = flow time of toluene at 30° C., in seconds, through a Cannon No. 50 viscometer; and C = concentration (mg/dl) of the sample in toluene. The extent of development of brittleness of the films was determined by bending the film and cutting it with a sharp edge (razor). As reported, the term "brittle" relates to film that could be bent and cut with a sharp edge whereas the term "very brittle" relates to film that broke on bending and shattered upon cutting with a razor.

In the following tabulation, a polystyrene film (about 5 mil) with and without benzophenone as a component of the film composition, were exposed outdoors at 45° South at Edison, N.J., according to ASTM-1435-58. The effectiveness of benzophenone as a photodegradability-enhancing agent is evident from the values obtained and set forth in the following tabulation for brittleness and RSV versus the control.

| Film Composition | | | | |
|---|---|---|---|---|
| Polystyrene (Wt. %) | Benzophenone (Wt. %) | Exposure (Days) | Brittleness | RSV |
| 100(control) | — | 0 | Flexible | 0.97 |
| 100(control) | — | 30 | Brittle | 0.74 |
| 99.5 | 0.5 | 30 | Extremely Brittle | 0.55 |

The following tabulation sets forth results obtained from additional outdoor exposure tests at Edison, N.J., with a film of atactic polystyrene (about 5 mils thick) containing benzoin or benzophene, combinations of benzophenone with specified pro-oxidant metal acetylacetonates, and for comparison purposes, containing such metal acetylacetonates but devoid of benzoin or benzophenone, and the polystyrene film per se as a control.

| | | Film Composition | | | | | |
|---|---|---|---|---|---|---|---|
| Example | Polystyrene (grams) | Cobalt Acetylacetonate (milligrams) | Ferric Acetylacetonate (milligrams) | Benzophenone (milligrams) | Benzoin (milligrams) | Aging Time Days | RSV |
| 1 | 40(control) | — | — | — | — | 0 | 0.97 |
| 2 | 40(control) | — | — | — | — | 30 | 0.74 |
| 3 | 40 | 48.72 | — | — | — | 30 | 0.63 |
| 4 | 40 | — | 48.32 | — | — | 30 | 0.53 |
| 5 | 39.8 | — | — | 200 | — | 30 | 0.55 |
| 6 | 39.8 | 48.72 | — | 200 | — | 30 | 0.45 |
| 7 | 39.8 | — | 48.32 | 200 | — | 30 | 0.30 |
| 8 | 39.6 | — | — | — | 400 | 30 | 0.41 |
| 9 | 39.9 | — | — | — | 400(benzil) | 30 | 0.66 |

Such data illustrates the marked effectiveness of benzoin alone (Example 8) in reducing the RSV versus the control Examples 1 and 2 and, in particular, as compared to values shown for use of benzophenone alone (Ex. 5) and ferric acetylacetonate alone (Ex. 4), the marked effectiveness of use of ferric acetylacetonate in combination with benzophenone (Ex. 7) by which the RSV was reduced to the extremely low value of 0.30.

In the following tabulation, results (RSV values) are set forth from accelerated aging tests (in a weatherometer) of sheets (about 100 mils thick) of foam polystyrene composition containing benzoin, cobalt stearate or manganese stearate in the concentrations set forth; and combinations of benzoin with each of those stearates. The foam polystyrene composition was prepared utilizing an atactic polystyrene (Dow 685) and pentane as a blowing agent with the foam composition having a density of about 4 pounds/cu.ft. The RSV values are those obtained by weathering tests in an Atlas Weather-O-Meter at 145° F., 30% Relative Humidity Carbon Arc, and measuring the RSV of cross-sections cut out from the area of the sample exposed to the weatherometer.

| Example | Composition | | | | Hours in Weather-O-Meter | RSV |
|---|---|---|---|---|---|---|
| | Polystyrene (% by wt.) | Benzoin (% by wt.) | Cobalt Stearate (ppm of Co)* | Manganese Stearate (ppm of Mn)* | | |
| 1 | 100(control) | — | — | — | 170 | 0.72 |
| 2 | 99 | 1.0 | — | — | 170 | 0.59 |
| 3 | 98.95 | 1.0 | 200 | — | 170 | 0.43 |
| 4 | 99.77 | — | 200 | — | 170 | 0.69 |
| 5 | 98.77 | 1.0 | — | 200 | 170 | 0.44 |
| 6 | 99.77 | — | — | 200 | 170 | 0.68 |

* = parts/million

Such data illustrates that, whereas the use of cobalt stearate alone (Ex. 4) or manganese stearate alone (Ex. 6) did not very substantially effect reduction in RSV of the foam polystyrene, their use in combination with benzoin (Ex. 3 and 5) functioned in synergistic manner with the benzoin. This is evident from the value 0.59 for RSV shown for the use of 1.0% benzoin (Ex. 2) and 0.69 for cobalt stearate alone (Ex. 4) versus the markedly reduced value of 0.43 shown for the combination of benzoin and cobalt stearate (Ex. 3). A similar synergistic effect is apparent fom the values shown for use of manganese stearate in combination with benzoin as compared to individual use of benzoin or manganese stearate.

The data in the following tabulation includes results obtained from Atlas Fade-O-Meter tests, on a polystyrene foam composition (density of 4 pounds/cu. ft.) with the noted additives (FDA approved for foodstuff packaging) under the conditions of ASTM-D-1499 using a Xenon lamp. The foam composition was prepared by blending the polystyrene, the benzoin and the metal salts (6% solution in kerosene) and extruding the compositions using pentane as a blowing agent, into a foam sheet (50 ml. thick). The RSV values set forth were determined on cross section samples cut out from the foam sheet exposed in the Fade-O-Meter for 180 hours.

| Example | Concentration in Polystyrene Foam | | RSV |
|---|---|---|---|
| | Metal Salt (ppm. of metal) | Benzoin (% by wt.) | |
| 1(control) | — | — | 0.64 |
| 2 | 200-cobalt naphthenate | — | 0.64 |
| 3 | " | 1 | 0.45 |
| 4 | 200-manganese naphthenate | — | 0.63 |
| 5 | " | 1 | 0.40 |
| 6 | 200-ferric naphthenate | — | 0.45 |
| 7 | 200-manganese naphthenate (plus 1% calcium stearate) | 1 | 0.42 |

This invention has been described in detail with particular reference to preferred embodiments but it will be understood that variations and modifications can be effected within the spirit and scope of the invention as described hereinbefore and as defined in the appended claims. Thus, in addition to the photodegradability enhancing additives blended with the polystyrene component of the compositions embodied herein, such compositions may also include other additives conventionally incorporated into polystyrene compositons including pigments for coloring purposes.

What is claimed is:

1. A composition of atactic polystyrene blended with a small amount of benzoin, based on the weight of the polystyrene, sufficient to accelerate the photodegradation of said composition.

2. A composition, as defined in claim 1, containing about 1 % benzoin based on the weight of the polystyrene.

3. A composition of atactic polystyrene blended with containing from about 0.01 to about 5% of benzoin, based on the weight of the polystyrene, sufficient to accelerate photodegradation of the polystyrene.

4. A composition, as defined in claim 3 wherein the polystyrene is polystyrene foam.

5. A composition, as defined in claim 3, which in addition contains a stearate of cobalt or manganese in amount providing from about 0.0001 to about 5% of the metal component of said stearate, based on the weight of the polystyrene, sufficient in combination with the benzoin to synergistically accelerate the photodegradation of the polystyrene.

6. A composition, as defined in claim 5 that contains, based on the weight of the polystyrene, one percent of cobalt or manganese stearate.

7. A composition, as defined in claim 6, in which the polystyrene is polystyrene foam.

* * * * *

UNITED STATES PATENT AND TRADEMARK OFFICE
CERTIFICATE OF CORRECTION

PATENT NO. : 4,076,655
DATED      : February 28, 1978
INVENTOR(S) : ARNE O. FINBERG It is certified that error appears in the above-identified patent and that said Letters Patent are hereby corrected as shown below:

Column 1, line 23  "incorporation" should be --incorporating--.

Column 1, line 26  "accelerate" should be --polystyrene--.

Column 6, line 46  "containing" should be deleted.

Signed and Sealed this

Eleventh Day of July 1978

[SEAL]

Attest:

RUTH C. MASON
Attesting Officer

DONALD W. BANNER
Commissioner of Patents and Trademarks